United States Patent [19]

Bardaud et al.

[11] Patent Number: 6,006,180
[45] Date of Patent: *Dec. 21, 1999

[54] METHOD AND APPARATUS FOR RECOGNIZING DEFORMED SPEECH

[75] Inventors: Philippe Bardaud, Marly le Roi; Gérard Chollet, Saint German de la Grange, both of France

[73] Assignee: France Telecom, Paris, France

[21] Appl. No.: 08/379,870

[22] Filed: Jan. 27, 1995

[30] Foreign Application Priority Data

Jan. 28, 1994 [FR] France ................................. 94 01235

[51] Int. Cl.⁶ .......................................................... G10L 5/00
[52] U.S. Cl. .......................................... 704/223; 704/264
[58] Field of Search ................................. 395/2.18, 2.77, 395/2.28, 2.74, 2.32, 2.73, 2.67, 2.81; 704/209, 268, 219, 265, 223, 231, 258, 236, 243, 261, 264, 266

[56] References Cited

U.S. PATENT DOCUMENTS

| | | | |
|---|---|---|---|
| 3,995,116 | 11/1976 | Flanagan | 395/2.76 |
| 4,246,617 | 1/1981 | Portnoff | 360/32 |
| 4,342,104 | 7/1982 | Jack | 367/132 |
| 4,566,117 | 1/1986 | Suckle | 395/2.77 |
| 4,624,012 | 11/1986 | Lin et al. | 395/2.7 |
| 4,852,168 | 7/1989 | Sprague | 395/2.77 |
| 4,969,192 | 11/1990 | Chen et al. | 395/2.28 |
| 5,163,110 | 11/1992 | Arthur et al. | 395/2.09 |
| 5,327,521 | 7/1994 | Savic et al. | 395/2.81 |
| 5,528,726 | 6/1996 | Cook | 395/2.7 |
| 5,577,160 | 11/1996 | Hosom et al. | 395/2.18 |

OTHER PUBLICATIONS

Fifth International Conference on Electronics for Ocean Technology; Duncan, "Correction of the helium speech effect by short time autoregressive signal processing". pp. 125–130, Mar. 1987.

ICASSP 83, 1983, Boston, PP. 1160–1163, E. O. Belcher et al., "Helium Speech Enhancement By Frequency–Domain Processing".

The Radio And Electronic Engineer, vol. 52, No. 5, May 1982, PP. 211–223, M. A. Jack et al., "The Helium Speech Effect and Electronic Techniques For Enhancing Intelligibility In a Helium–Oxygen Environment".

ICASSP 83, 1883, Boston, pp. 1160–1163, Belcher et al., "Helium Speech Enhancement by frequent –Domain Processing"Jun. 1983.

IEEE Engineering in Medicine and Biology Magazine vol. 12; Mackay, "Speaking and whisling with non–aur gases", pp. 114–115 Dec. 1993.

*Primary Examiner*—Richemond Dorvil
*Attorney, Agent, or Firm*—Dvorak & Orum

[57] ABSTRACT

An apparatus and method for recognizing deformed speech signals outputted from a microphone includes a module for comparing deformed signals with simulated deformed signals that are generated from non-deformed speech signals that have previously been digitized and stored in a memory. Frequencies of the formants of simulated deformed signals are about two-three times the frequencies of the formants of digitized non-deformed signals.

8 Claims, 2 Drawing Sheets

METHOD AND APPARATUS FOR RECOGNIZING DEFORMED SPEECH

BACKGROUND OF THE INVENTION

The present invention relates to a method and to a system for processing a speech signal.

The technical field of the invention is that of methods and systems for processing signals.

The invention relates more particularly to a method and to apparatus for processing speech signals in order to facilitate the recognition of speech signals that have been disturbed or deformed, in particular speech uttered by an undersea diver.

DESCRIPTION OF THE PRIOR ART

It is known that the speech of divers is deformed and made difficult to understand (i.e. incomprehensible for human beings) for various reasons: the composition of the gas mixture breathed by the diver is very different from the gas composition of normal earth atmosphere (such mixtures generally being made up of nitrogen, oxygen, helium, hydrogen, . . . ), and also the pressure of the gas mixture, together with other parameters all modify and deform the speech uttered by the speaker (the diver), and consequently change the appearance and the characteristics of the corresponding speech signals that are delivered by a microphone into which the diver speaks.

Work has been performed to understand the mechanism of such deformations and to attempt to improve the intelligibility of divers' speech.

The modifications include variations in pitch and in formants.

The document "The helium speech effect and electronic techniques for enhancing intelligibility in the helium-oxygen environment" by Jack et al., published in the Ratio and Electronic Engineer, Vol. 52, No. 5, pp. 211–223, May 1982, describes techniques used to improve the intelligibility of the speech of divers.

Presently known systems operate in real time to modify the deformed speech signals delivered by a microphone into which a diver is speaking, by means of electronic devices of greater or lesser sophistication which operate on the basis of a model (necessarily an approximate model) of the mechanisms whereby the speech is deformed, so as to enable speech uttered by the diver to be understood by a second party, generally situated on land or on the surface of the water.

Those signal-correction systems are generally situated on land or at the surface (e.g. on a ship or a platform), or else they include a portion situated close to the diver, as in U.S. Pat. No. 4,342,104 (Jack), for example.

The problem consists in providing a method and a system for processing speech signals and designed to be incorporated in a system for recognizing deformed speech, for the purpose of facilitating or improving intelligibility of speech signals.

SUMMARY OF THE INVENTION

The solution to the problem posed consists in providing a system for processing a speech signal (P), which system includes electronic and preferably essentially digital means for increasing, preferably in substantially linear manner, the frequencies ($f_1$, $f_2$) of the formant of said speech signal by a factor that is close to 2 or 3, i.e. including means for multiplying said formant frequencies by a number that is close to 2 to 3 (where the formants are frequencies about which a significant fraction of the energy of said speech signal is concentrated, due to the human vocal track being resonant at those frequencies).

Advantageously, a system of the invention includes:

extraction means responsive to said speech signal (P) for extracting (i.e. computing on the basis of said speech signal) an excitation signal (or a residual signal) representative of the sound and vibration sources of the speech (vocal cords, flows of gas being breathed, . . . );

envelope determination means responsive to said speech signal to compute coefficients characteristic of the shape of the spectrum envelope of said speech signal (or characteristics of said formants);

interpolation means, responsive to said excitation signal to generate an interpolated excitation signal having a waveform (or appearance) identical to the waveform of said excitation signal and having a (time) density of points (or samples or values) that is two or three times the density of points in said excitation signal; and synthesis means responsive to said interpolated excitation signal and to said characteristic coefficients to synthesize a simulated deformed speech signal (D) (or simulated hyperbaric speech).

Advantageously, a system of the invention includes a linear prediction coding module that combines (or constitutes) said extraction means and said envelope determination means.

Advantageously, a system of the invention includes preprocessor means for preprocessing said speech signal and comprising:

pre-emphasis means for boosting the high frequency components of said speech signal a little; and windowing means for weighting a signal segment (i.e. a window) or a time sequence of said speech signal in application of a curve of predetermined shape, e.g. a "Hamming" window.

The invention also consists in providing a system for recognizing deformed speech signals (A) (i.e. speech uttered in an atmosphere whose gaseous composition and/or pressure is different from that of normal earth atmosphere) delivered by a microphone, which system includes a module for comparing said deformed signal (A) with simulated deformed signals (D) obtained (generated) from previously digitized non-deformed speech signals (P) stored in a memory, and in which the frequencies of the formants of said simulated deformed signals are close to two or three times the frequencies of the formants of said digitized non-deformed signals.

Advantageously, the recognition system comprises:

apparatus for generating data (s) representative of simulated deformed signals (D) obtained from non-deformed speech signals (P) and for storing data in a memory (e.g. so as to constitute a database or data file specific to a given speaker), the apparatus comprising:

conversion means for digitizing (or sampling) an analog speech signal into a time sequence of samples or numerical values x(n) of non-deformed speech;

pre-emphasis digital means (or digital filter) for boosting the high frequency components of the sampled speech signal x(n) a little;

windowing means for weighting a window (or a time sequence of samples of said non-deformed speech signal) in application of a curve of predetermined shape;

extraction means responsive to said speech data x(n) representative of said non-deformed speech signal to extract therefrom excitation digital data e(n) representative of an excitation signal;

envelope determination means responsive to said non-deformed speech data to compute characteristic coefficients a(i) of the shape of the spectrum envelope of said non-deformed speech signal (or characteristics of said formants);

linear interpolation means responsive to said excitation data e(n) to generate interpolated excitation data ei(n) having a waveform (or appearance) identical to the waveform of said excitation data and having a (time) density of points (or samples or values) that is two or three times the density of points of said excitation data; and synthesis means responsive to said interpolated excitation data ei(n) and to said characteristic coefficients a(i) to synthesize (by computation) data s(n) representative of a simulated deformed speed signal;

conversion means for converting said simulated deformed speech data s(n) into analog simulated deformed speech signals (D); and a comparator module for comparing the deformed speech signals (A) with said simulated deformed signals (D).

The invention also consists in implementing a method of recognizing deformed speech signals (A) delivered by a microphone, in which:

non-deformed speech signals (P) uttered by at least one given speaker under conditions (pressure and gas mixture being breathed, in particular) similar or identical to those of the average or normal earth atmosphere are digitized and stored in a memory;

simulated deformed signals (D) are generated on the basis of said non-deformed speech signals (P), the frequencies of performance of said simulated deformed signals being close to two or three times the frequencies of the formants of said non-deformed signals (that have been digitized); and a comparator module is used to compare said deformed signals (A) with said simulated deformed signals (D), e.g. by computing distances.

Advantageously, in the method of the invention:

said signal (P) is sampled and digitized at a first frequency (fe) e.g. close to 10 kHz (10,000 Hz), with the successive data values (y(1), . . . , y(n)) obtained being stored in a memory;

said signal (D) is obtained by subjecting data (s(1), . . . , s(3n)) representative of said simulated deformed signal (D) to digital-to-analog conversion and sampling at a second frequency (fs) close to two or three times said first frequency;

said data representative of said signal (D) is obtained by synthesis or superposition of data (ei(1), . . . , ei(3n)) representative of an interpolated excitation signal (ei) and of a spectrum envelope determined by coefficients (ai(1), . . . , ai(k));

said data representative of said interpolated excitation signal (ei) is obtained by interpolation of data (e(1), . . . , e(n)) representative of a non-interpolated excitation signal (e); and said data representative of said non-interpolated excitation signal (e) and said characteristic coefficients of the spectrum envelope are calculated (i.e. extracted) from said non-deformed speech signal (P) by a linear predictive coding (LPC) method.

Alternatively, said simulated deformed signals are generated by making use of a linear multiple regression (LMR) method applied to the ceptral vectors of said digitized non-deformed speech signals.

An advantage obtained by the invention is that it is easy to build up files or a database of simulated signals that are representative of simulated deformed speech, i.e. from speech signals that are "clean", i.e. that are not deformed.

It is thus possible for each diver or speaker and at smaller expense to build up a personal file comprising speech signals (or words) uttered under normal conditions, together with a corresponding personalized file containing signals representative of the same words under simulated deformation conditions (i.e. simulated deformed speech signals).

The simulated deformed speech signals (e.g. several tens or hundreds of words) can then be recorded on a recording medium suitable for use in an "on-board" system, i.e. placed or immersed close to the diver while diving. This can enable the diver himself to monitor whether the deformed speech he utters is recognized by the recognition system, and to do so in time that is real or deferred only slightly. This constitutes a significant improvement over known voice recognition systems whose results cannot be known by the speaker (whether or not a word uttered in deformed manner has been recognized).

This provides advantages particularly with respect to safety for the diver himself when he desires to communicate with a party situated at the surface (or another diver), and can also enable the diver to control underwater tools by means of an on-board voice recognition system, which is practically impossible if the recognition system is located on the surface or on land.

The performance of said systems of the invention is considerably improved over that of known systems, in particular because a comparison is preferably performed between deformed speech and simulated deformed speech derived from non-deformed speech uttered by the same speaker.

Another advantage obtained is that it is possible to generate files (or databases) of simulated deformed speech at smaller cost and suitable for use in testing the performance of other recognition systems.

DETAILED DESCRIPTION OF THE DRAWINGS

The characteristics and advantages of the invention will be better understood from the following description which refers to the accompanying drawings showing implementations of the invention by way of non-limiting illustration.

DESCRIPTION OF THE PREFERRED EMBODIMENT

Figure 1:
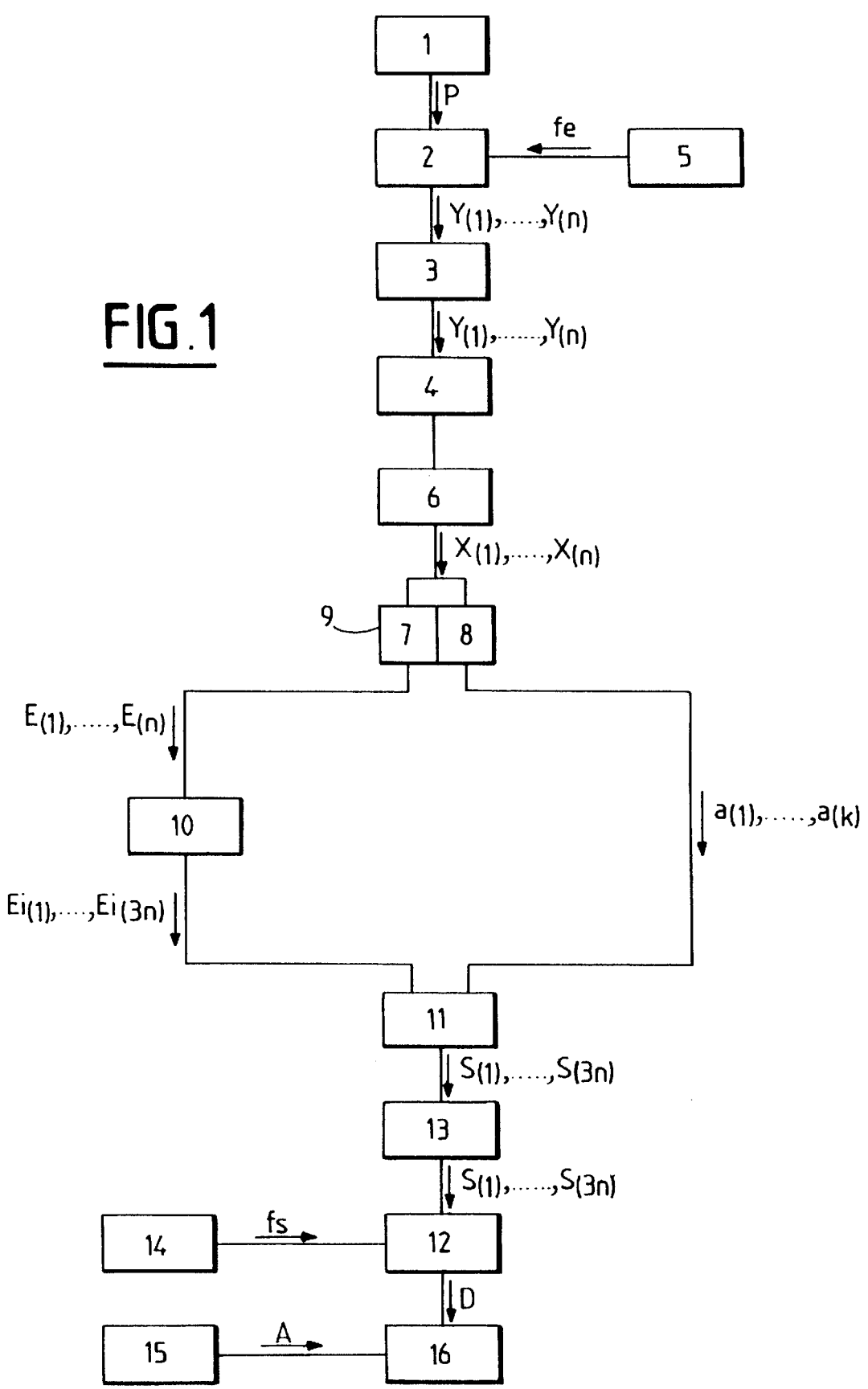
FIG. 1 is a block diagram of the essential components of a system of the invention for use in application of the method of the invention.
Figure 3:
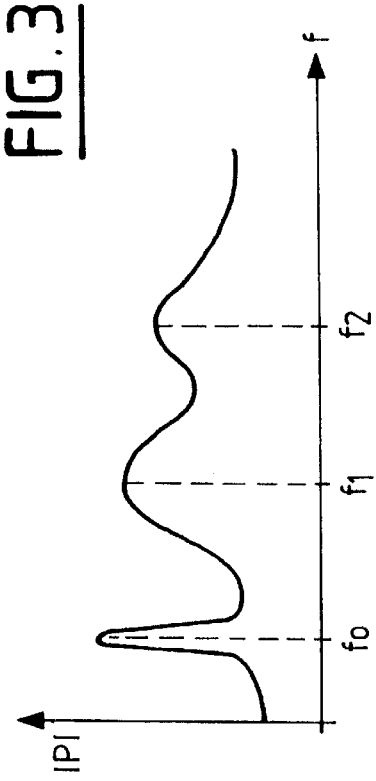
FIG. 3 is a diagram showing the appearance of the spectrum of said signal.
Figure 5:
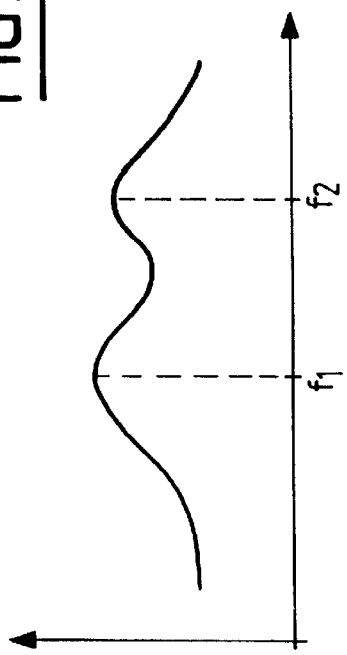
FIG. 5 is a diagram of a spectrum envelope curve used in synthesizing a simulated deformed speech signal.
Figure 2:
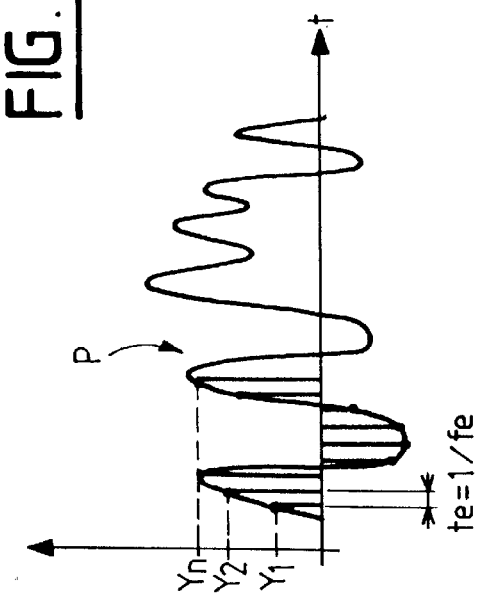
FIG. 2 is a diagrammatic waveform of a non-deformed speech signal P.
Figure 4:
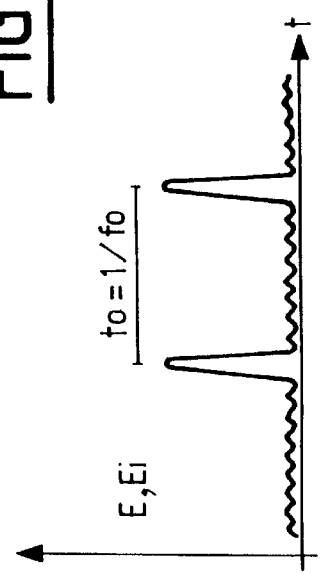
FIG. 4 is a diagrammatic waveform of an excitation signal E and of an interpolated excitation signal Ei obtained from the excitation signal E.

With reference to FIG. 1, in particular, a recognition system of the invention comprises:

a microphone 1 responsive to speech uttered by a speaker, which microphone delivers non-deformed speech signals P to an analog-to-digital converter 2 that digitizes the signal P at a sampling frequency fe controlled by a clock 5; the (n) digital data samples obtained (FIGS. 1 and 2) y(1), ..., y(n) are stored in a memory 3 which may be structured as a database;

apparatus for simulating deformation of the speech signal P and comprising:

a digital pre-emphasis filter 4 which receives the data y(1), ..., y(n), and which then applies the filtered data to a windowing or weighting module 6 which delivers n preprocessed data samples x(1), ... x(n) representative of a preprocessed version of said signal P;

a linear prediction coding module 9 itself comprising a module 7 for computing or extracting n data samples e(1), ..., e(n) representative of an excitation signal E (FIG. 4), and a module 8 for computing k coefficients a(1), ..., a(k) representative of the spectrum envelope (FIG. 5) of the signal P (with the omission of the peak centered on the frequency $f_o$ which corresponds to pitch, see FIG. 3);

an interpolation module 10 which doubles or triples the density of points (or values) in the signal E to deliver an interpolated excitation signal Ei identical to the signal E (FIG. 4);

a synthesizer module 11 which computes data samples s(1), ..., s(3n) representative of a simulated deformed signal S by superposing the interpolated excitation signal and the spectrum envelope defined by the k coefficients a(1), ... a(k); and an output memory 13 enabling the digital simulated deformed signal S to be stored;

the data s(1, ..., 3n) representative of the simulated deformed signal S can then be presented to the input of a digital-to-analog converter 12 controlled by a clock 14 that delivers a sampling signal at an output sampling frequency fs that is two or three times the input sampling frequency fe of the converter 2; and the analog simulated deformed speech signal D obtained this way is compared with a genuinely deformed speech signal A delivered by a microphone 15.

Instead of using LPC computation, the deformed speech simulator may optionally use means that perform LMR computation.

By using the LPC method of computation, it is possible, in the input speech signal, to distinguish the contribution of excitation sound sources (in particular the vocal chords which define pitch) in the speech signal P from the contribution of the vocal track of the speaker which gives rise to the spectrum envelop that is characterized by particular frequencies (formants).

Figure 6:
FIG. 6 is a diagram showing how a simulator operates that makes use of a linear predictive coding method.

The method is used on the following principles (see FIG. 6 in particular):

the production of a speech signal X by a given speaker is schematically modelled as follows: the speech signal X results from the excitation signal E being filtered by an all-pole filter H(z) where H(z) can be defined as follows:

$$H(z)*(\Sigma_j a(j)*z^j)=1, \text{ where } j \text{ varies from 1 to } k;$$

in the above, H(z) is representative of the transformation applied by the resonances of the speaker's vocal track on the sound excitation signal E produced by the vocal chords, which transformation gives rise, in the spectrum of the speech signal P (FIG. 3), to maxima centered on frequencies $f_1$ and $f_2$ known as "formants";

the shape of the spectrum envelope (FIG. 5) which is modelled by the k coefficients a(j) is identical or very close to the shape of the spectrum of the signal P, with the exception of the peak centered on the fundamental frequency $f_o$ (pitch) which is to be found in the excitation signals E and Ei in the form of peaks that are spaced apart by a time interval $t_o=1/f_o$ (FIG. 4);

it is assumed that the n-th sample x(n) of the speech signal is a linear combination of the excitation signal sample e(n) and of the k preceding samples, which can be written:

$$x(n)=e(n)-\Sigma_j(a(j)*x(n-j)) \text{ where } j \text{ varies from 1 to } k;$$

the coefficients a(j) are prediction coefficients; if the excitation sample e(n) is zero, it is possible in application of the above formula to predict the value x(n) of the speech signal sample with a prediction error whose value err(n) is given by the following:

$$err(n)=\Sigma_j(a(j)*x(n-j)) \text{ where } j \text{ varies from 1 to } k;$$

in the LPC method, the k values of the k coefficients a(1), ..., a(k) that enable the prediction error to be minimized are calculated for each sample x(n), which is equivalent to minimizing the quadratic error Q which is given by:

$Q=\Sigma_m(err(m))^2$ where m varies from 0 to (T−1), T being the sample number of the time window taken into consideration; and which is equivalent to zeroing the partial derivative of the quadratic error relative to the coefficients a(j).

These calculations produce values e(1) ..., e(n) representative of an error signal that can be treated as the excitation signal, and a spectrum envelope of the corresponding transfer function of the vocal track.

Surprisingly, it has been found that a linear transformation of the spectrum envelope (i.e. of the formants $f_1$, $f_2$, see FIG. 3) provides satisfactory simulation of the transformations due to the speaking conditions; the excitation signal E is interpolated at a factor that is preferably equal to 2 or 3.

An output signal as deformed by the above simulation is synthesized from the interpolated excitation signal Ei and from the coefficients a(j) by the formula:

$$s(n)=\Sigma_j(a(j)*s(n-j))+ei(n)$$

This superposition gives rise to the linear frequency "shift" in the spectrum of the resulting simulated signal, with peaks that correspond to the formant frequencies being shifted by a factor that is equal to the interpolation factor used, which is preferably equal to 2 or 3.

Simulation and recognition systems can be implemented, for example, by using a PC microcomputer fitted with a mother board based on an 80386 microprocessor (manufactured by Intel) clocked at 33 MHz, and associated with an 80387 arithmetic coprocessor (same manufacturer). A signal processing card installed in the PC microcomputer takes care of the hyperbaric simulation processing and of speech recognition.

Such a card is essentially made up of a TMS320C30 processor (manufactured by Texas Instruments), an analog input, and analog-to-digital and digital-to-analog converters operating at a maximum sampling frequency of 200 kHz.

Hyperbaric speech simulation consists in isolating words uttered in an ambient earth atmosphere, and in transforming them so as to simulate the same words as uttered in a hyperbaric atmosphere. No real time constraints are necessary for this type of processing. Nevertheless, for reasons of computation time, the processing is performed by the signal processor card.

The recognition system must operate in real time. As a result it may be installed on and optimized for the signal processor card.

We claim:

1. A system for processing a non-deformed speech signal spectrum, the speech signal spectrum having a first and a second frequency which represent a respective formant of said speech signal, the system comprising:

extraction means responsive to said speech signal to extract therefrom an excitation signal representative of the sound and vibration sources of the speech;

envelope determination means responsive to said speech signal to compute coefficients characteristic of the shape of the spectrum envelope of said speech signal;

interpolation means responsive to said excitation signal to generate an interpolated excitation signal having a waveform that is identical to the waveform of said excitation signal and having a point density that is about two to three times the point density of said excitation signal;

synthesizer means responsive to said interpolated excitation signal and said characteristic coefficients to synthesize a deformed speech signal;

electronic means for linearly increasing the frequencies of the formants of said speech signal by a factor of about 2 to 3.

2. The system according to claim 1, further including a linear predicting coding module which combines said extraction means and said envelope determining means.

3. The system according to claim 1, further including preprocessor means for preprocessing said speech signal comprising pre-emphasis means for boosting the high frequency components of said speech signal and windowing means for weighting a signal segment in application of a curve of a predetermined shape.

4. A system for recognizing deformed speech signals delivered by a microphone, the system comprising:

an apparatus for generating speech data representative of simulated deformed signals generated from non-deformed analog speech signals and for storing said data in a memory, said apparatus comprising:

a) conversion means for digitizing said analog speech signals into a time sequence of digital values representing a digitized sampled speech signal, said digitized sampled speech signal having high frequency component that represent said formants of speech;

b) digital pre-emphasis means for boosting the high frequency components of the digitized sampled speech signal;

c) windowing means for weighting a window in application of a curve of predetermined shape;

d) extraction means responsive to said speech data representative of said speech signal to extract digital excitation data representative of an excitation signal;

e) envelope determination means responsive to said speech data to compute coefficients characteristic of a shape of a spectrum envelope of said digitized speech signal;

f) interpolation means responsive to said excitation data to generate interpolated excitation data having a waveform that is identical to a waveform of said excitation data and having a point density that is about two to three times a point density of said excitation data; and g) synthesizer means responsive to said interpolated excitation data and to said characteristic coefficients to synthesize data representative of a simulated deformed speech signal;

means for converting said simulated deformed speech data into analog simulated deformed speech signals, wherein the frequencies of the formants of said simulated deformed signal are about two to three times the frequencies of the formants of said digitized non-deformed signals; and a comparator module for comparing the deformed speech signals with said simulated deformed signals.

5. A method of recognizing deformed speech comprising the steps of:

digitizing and storing non-deformed speech signals in a memory;

generating simulated deformed speech signals from said non-deformed speech signals, the simulated deformed speech signals including frequencies representing formants of speech;

increasing the frequencies of the formants of said simulated deformed signals by a factor of about two to three times with respect to the frequencies of the formants of said digitized non-deformed signals; and comparing said deformed signals with said simulated deformed signals.

6. The method according to claim 5, wherein said signal is sampled and digitized at a first frequency, the resulting successive data values being stored in a memory, said signal obtained by subjecting data representative of said signal to digital-to-analog conversion and sampling at a second frequency by a factor of two to three times said first frequency, said data representative of said signal obtained by one of synthesis and superposition of data representative of an interpolation excitation signal and a spectrum envelope defined by coefficients wherein said data representative of said interpolation excitation signal is obtained by interpolation of data representative of a non-interpolated excitation signal and wherein said data representative of said non-interpolated excitation signal and said characteristic coefficients of the spectrum envelope are calculated from said non-deformed speech signal by a method of linear predictive coding.

7. A method according to claim 5, wherein said simulated deformed signals are generated by using a multiple linear regression method applied to the cepstre vectors of said non-deformed speech signals.

8. The method according to claim 5, wherein comparing said deformed signals with said simulated deformed signals is performed by computing distances on said curve.

* * * * *